March 8, 1927.

L. BLOCH 1,620,186

SHUT-OFF VALVE WITHIN BODY OF FIXTURE

Filed April 12, 1924

Inventor
L. Bloch
By Hull Brock & Wells
Attys.

Patented Mar. 8, 1927.

1,620,186

UNITED STATES PATENT OFFICE.

LEON BLOCH, OF CLEVELAND, OHIO, ASSIGNOR TO THE REPUBLIC BRASS COMPANY, OF CLEVELAND, OHIO, A CORPORATION OF OHIO.

SHUT-OFF VALVE WITHIN BODY OF FIXTURE.

Application filed April 12, 1924. Serial No. 706,136.

This invention relates generally to plumbing fixtures and more particularly to a shut off within the body of the fixture, which in the present instance is a compound faucet usable in connection with sinks, tubs and other receptacles.

At the present time, a shut off valve is provided so the flow of water can be cut off from the faucet whenever it is desired to repack valve stems or make any repair to the faucet and this cut off valve has usually been placed in the basement or in the wall beneath the sink or at the rear of the lavatory or laundry tub and besides being unsightly is very inconvenient of access.

The object of my invention, therefore, is to provide a shut off which shall be contained within the body of the fixture, with the operative part arranged at the front of the body and readily accessible.

Another object is to so construct and arrange the shut off that the general shape and appearance of the fixture will not be changed or impaired.

Another object is to provide a device which can be manipulated by the use of a screw driver or similar implement.

With these objects in view, the invention consists in providing the body of the fixture with a threaded bore upon the interior of the front side thereof and a valve seat at the rear of the body; arranging a valve within the body for seating against said seat, said valve being carried by a stem working through the threaded boss, the head of said stem being flush with the outer face of the body.

The invention consists also in certain details of construction and combination all of which will be more fully described hereinafter and pointed out in the appended claim.

Figure 1:
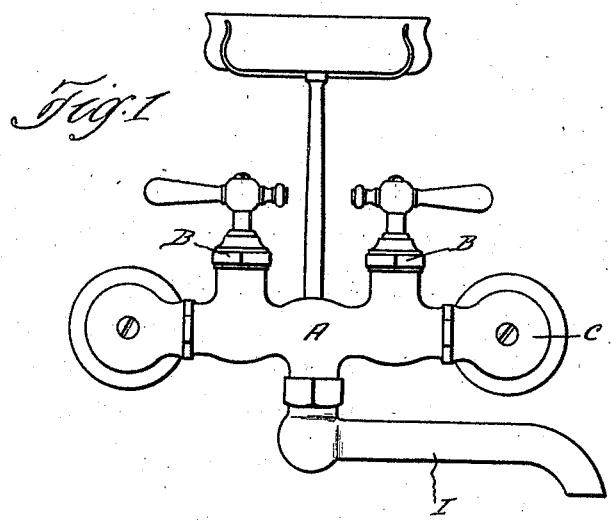
Figure 2:
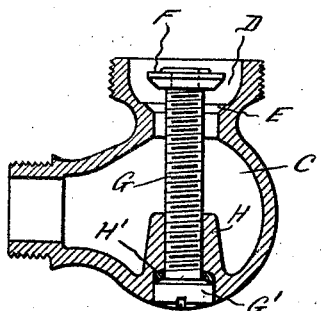

In the drawings forming a part of this specification Fig. 1 is a face view of a combination faucet embodying my invention; Fig. 2 is a detail sectional view of a portion of the body of the faucet and illustrating in detail the features of my invention.

Referring to the drawings A indicates the central portion of a faucet and B the usual form of control valves arranged therein and to each end of the central portion A there is attached an end body portion C. This body portion C has the inlet D and adjacent thereto I provide a valve seat E upon which the valve F is adapted to seat whenever it is desired to shut off the flow of water to the faucet in order to repair the same. This valve F is carried at the rear end of a stem G which is preferably threaded as shown and works through an inwardly projecting threaded boss H, this boss having a recess H' in the outer end thereof and in which a head G' of the threaded stem fits when the valve is open as most clearly shown in Fig. 2 and it will be noted that the head G' of the screw stem is flush with the exterior surface of the body portion C. A slot $G^2$ for the reception of a screw driver permits the stem to be readily turned in either direction in order to open or close the valve as desired. By placing the shut-off valve within the body of the faucet, ordinary additional valves projecting from the wall either beneath the sink or at any other point are avoided and the placement of such valves in the basement or other inconvenient place is also avoided.

At the present time when kitchens and bathrooms are provided with tiled walls the placement of additional shut off valves is more or less inconvenient. The advantages therefore of placing the shut off valve within the body of the faucet itself will be apparent to everyone skilled in the art to which this invention relates. It will be noted that it does not detract in the least from the ornamental appearance of the fixture and except for the slot in the head of the stem is not noticeable. While I have shown the body portion C as detachable from the central portion A it will of course be understood that if desired it may be made integral therewith. A swivel spout I is provided at the outlet of the faucet but this forms no part of the present invention.

It will thus be seen that I provide an exceedingly simple and highly efficient shut off device within the body of a fixture which will achieve all the objects hereinbefore recited.

While I have shown one embodiment of the valve and stem, it is obvious that the relative arrangement of these parts can be varied considerably without departing from the broad principle of the invention as defined in the appended claim, this broad principle involving the arrangement of a shut-off valve within the body of the fixture and operable from the exterior thereof without disturbing any of the other parts.

It is also preferable to interpose a packing washer between the recess in the boss and the head of the stem so as to provide a suitable packing at this point. The outer face of the head of the stem is rounded to conform to the contour of the exterior body portion.

Having thus described my invention, what I claim is:—

A faucet comprising two valve chambers, one of said chambers having an internally threaded boss formed integral therewith and a recessed portion adjacent said boss, a threaded stem carrying a valve at its inner end, its outer end being slotted and adapted to fit into said recessed portion, said slotted end being flush with the outer surface of said chamber when said valve is open, said other chamber having a service valve therein.

In testimony whereof, I hereunto affix my signature.

LEON BLOCH.